Sept. 29, 1970    R. H. FARCHMIN    3,531,006
CARTOP CARRIER
Filed Jan. 23, 1969    2 Sheets-Sheet 1
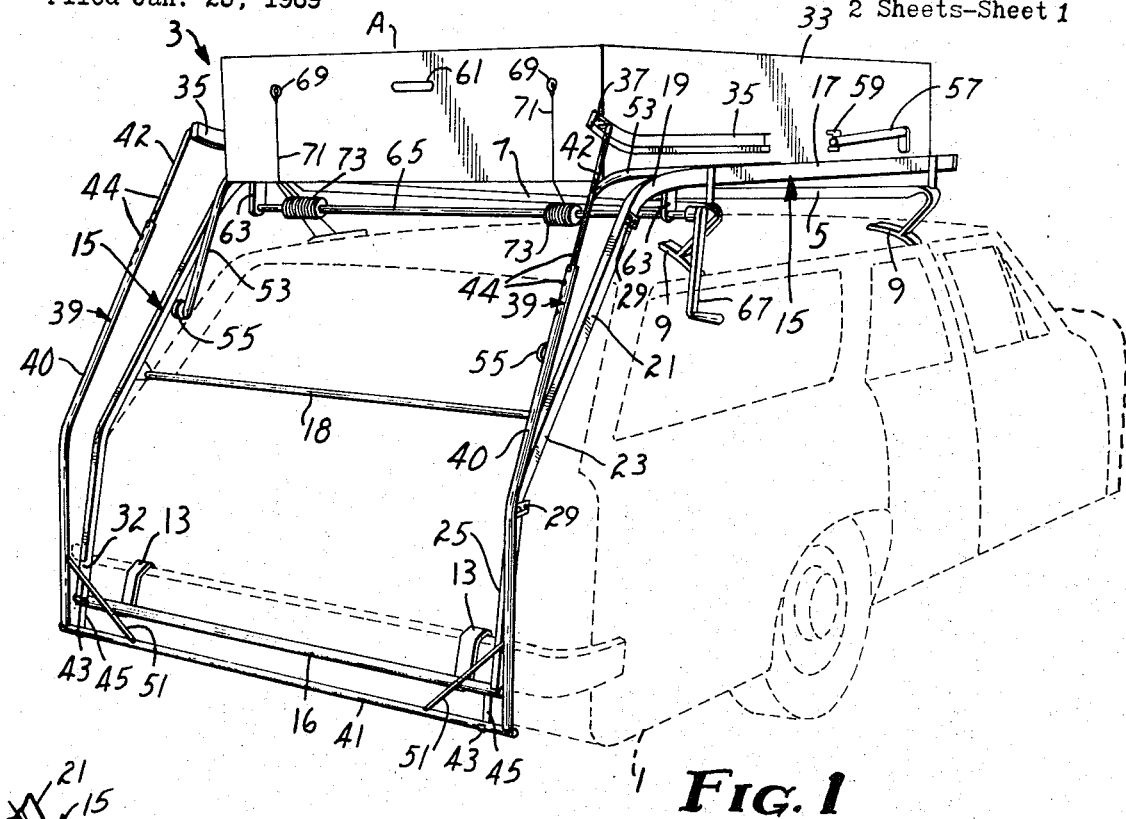
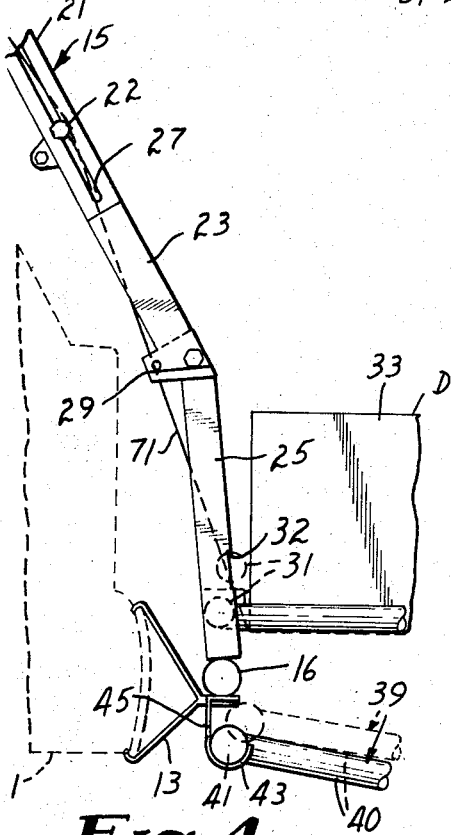
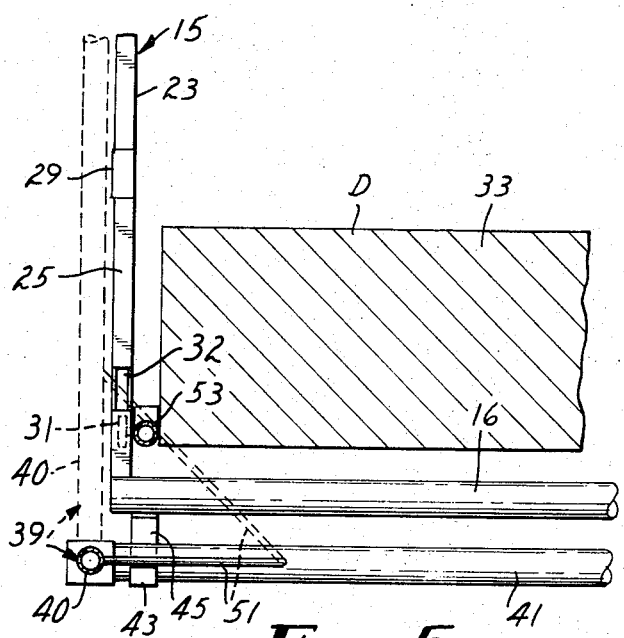
INVENTOR.
Roy H. Farchmin
BY
Walter N. Kirn Jr.
ATTORNEY

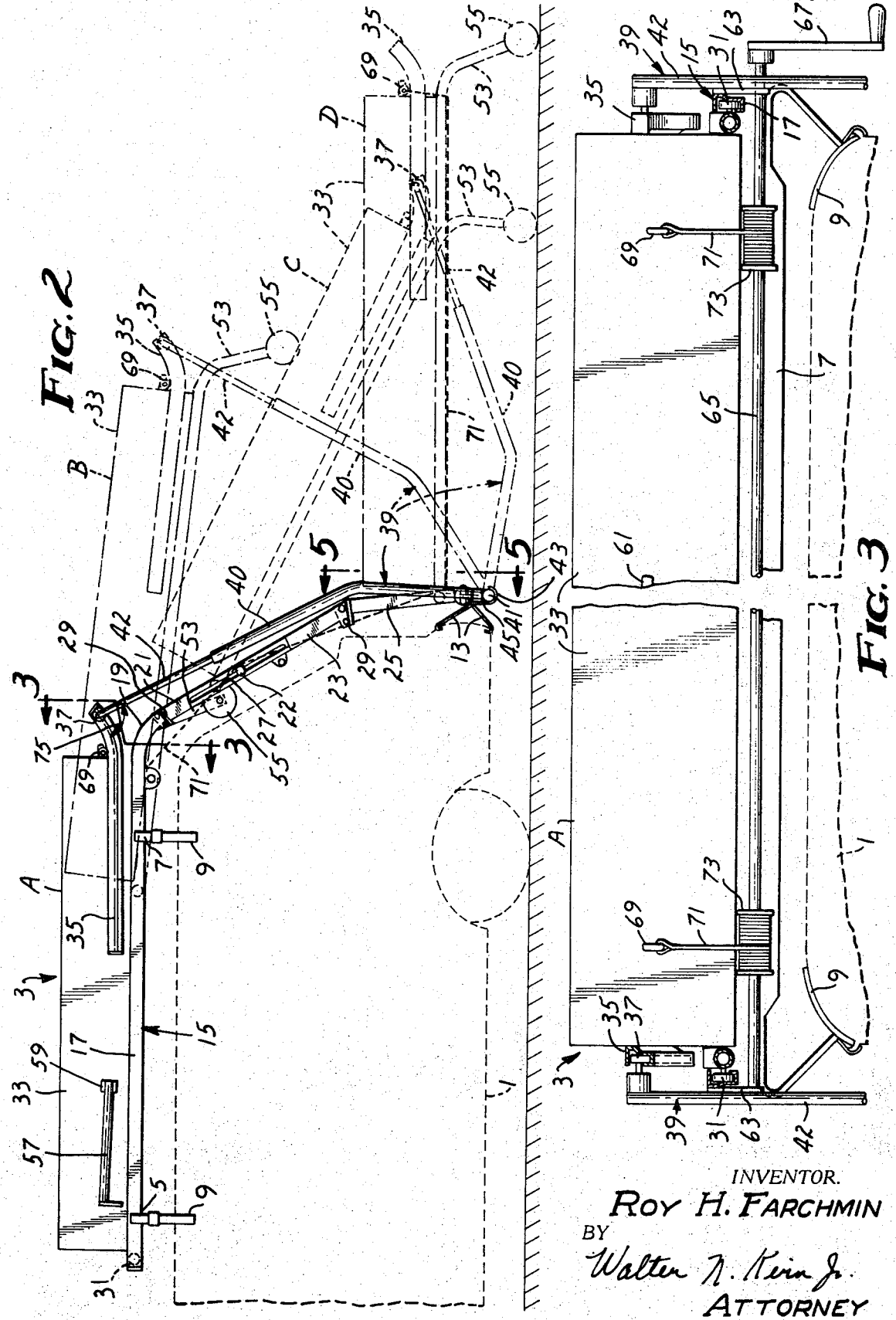

United States Patent Office 3,531,006
Patented Sept. 29, 1970

3,531,006
CARTOP CARRIER
Roy H. Farchmin, 2106 Scenic Place,
St. Paul, Minn. 55119
Filed Jan. 23, 1969, Ser. No. 793,367
Int. Cl. B60r 9/08
U.S. Cl. 214—450                                                      6 Claims

ABSTRACT OF THE DISCLOSURE

A cartop carrier having a cargo carrying rack which is moveable in a controlled manner between a transit position atop the car and a ground, takeoff position, the forward end of the rack being guided by a pair of primary tracks mounted on the car and rollers which engage such track, the rear end being guided by a pair of secondary or auxiliary tracks mounted on the sides of the rack in each of which slides a roller terminated radius arm pivoted from a position near the bumper line of the vehicle.

---

This invention relates to a vehicle top carrier; more particularly, it relates to a vehicle top carrier having a rack moveable between a transit position and a takeoff position for easy loading and unloading of the cargo.

With the increased interest being shown in outdoor recreational activities such as boating, camping, snowmobiling, etc., there has been a concomitant demand for a convenient means of loading, transporting and unloading the often heavy and cumbersome equipment employed in such activities.

Trailers offer certain advantages especially in ease of loading and unloading, but attendant drawbacks are many including relatively high cost, the need for taillights and other safety equipment, licensing, and loss of maneuverability, particularly in backing and turning the main vehicle.

The situation is generally reversed in the case of cartop carriers, their advantages being low cost, limited need for accessory equipment, portability, and little or no influence on vehicle maneuverability, while their disadvantages are difficulty in loading and unloading the equipment being transported, especially when two or more men are not available for the operations.

It is the primary object of this invention to provide a versatile equipment carrier for use in conjunction with a motorized vehicle which combines the advantageous features of both the cartop carrier and the trailer without the inclusion of their respective disadvantages.

Another object is the provision of such a versatile carrier which is adjustable to fit various sizes and shapes of motorized vehicles including sedans, station wagons, sports cars, campers and the like.

These and other object which will be more apparent hereinafter are provided by the present invention which is a carrier assembly of the cartop type comprising parallel, laterally spaced primary track means each having a roof line portion and a lowering portion downwardly depending from the roof line portion, a rack member, primary track engaging means associated with the rack member for movement thereof along the primary track means between a transit position and a takeoff position, secondary track means on opposing sides of said rack member, pivotally mounted arm members, secondary track engaging means associated with said arm members for movement of said arm members in secondary track means and engageable therewith between said transit position and said takeoff position of said rack member, the arm members and secondary track means being so disposed relatively to each other when said rack member is between said transit position and said takeoff position that the longitudinal axes of an associated secondary track means and arm member intersect at an angle of less than 90°, and elevating means for raising the rack member from the takeoff position to the transit position.

In the preferred embodiment of the above described invention, the carrier assembly is adjustable to various vehicle sizes, adjustment being provided both in the length and angular disposition of the primary track means and the arm members. The rack member is preferably detachably engageable with the primary track means. The rack member, which is also in engagement with the arm members, may be detachable therefrom and/or the arm members can be detachable from the motor vehicle with which it is to be associated, the end result being that the rack, with or without arm members, can be completely separated from the motor vehicle together with the load which it bears. Equipping the rack member with wheels allows the rack to be transported over the ground after disassociation from the motorized vehicle.

To promote a better understanding of the invention, reference is had to the accompanying drawings wherein:

FIG. 1 is a perspective view of the carrier assembly of this invention;

FIG. 2 is a side elevation of the embodiment of FIG. 1 showing movement of the assembly between a transit and takeoff position;

FIG. 3 is a sectional view taken along line 3—3 of FIG. 2;

FIG. 4 is an enlarged side view of a portion of the rear framework with some parts shown in broken line; and FIG. 5 is a sectional view taken along line 5—5 of FIG. 2 with some parts broken away.

Referring to FIGS. 1–5, a station wagon 1 of conventional shape is equipped with a carrier assembly 3, the points of attachment being a pair of conventional cartop crossbeams 5 and 7 having roof clamps 9 and a pair of bumper clamps 13. Attached to crossbeams 5 and 7 are a pair of primary tracks 15 which extend at least partially along the roof line of the vehicle 1 and then depend downwardly from the roof line to termination at support bar 16 which is held in bumper clamps 13. Intermediate bar 18 provides additional transverse stability. As illustrated, each of the primary tracks 15 is comprised of four sections, the first section 17 extending horizontally along the roof and terminating in a curved portion 19, a second section 21 hingably secured to the first section 17, a third section 23, and a fourth section 25. Angular adjustment of the second section may be achieved by the provision of a plurality of apertures therein, any one of which when matched with an aperture in plate 29 and secured by means of a nut and bolt, e.g., will give a different angular attitude. The third section 23 is telescoped within the second section 21 to provide for lengthwise adjustment of the track members 15 by means of a nut, bolt and washer arrangement (generally designated as 22) located as desired along the length of slot 27. The third section 23 is connected to the fourth section 25 at plate 29. Angular adjustment of the fourth section may be achieved by the provision of a plurality of apertures therein, any one of which when matched with an aperture in plate 29 and secured by means of a nut and bolt, e.g., will give a different angular attitude.

A rack member 33 is mounted in primary track members 15 by means of primary track engaging members 31 preferably in the form of rollers. Track members 15 are preferably shaped to captivate the primary track engaging means 31 such as by overhanging flanges. In FIGS. 4 and 5, a primary track engaging member 31 is shown in dotted lines at the lower end of the primary track 15. Slightly above this end position is an aperture 32 in the outer face of track 15. By lifting the rack 33 slightly from the stop position until the primary track engaging members 31 are opposite apertures 32, and then pulling the rack 33 away from the vehicle, the primary track engaging members 31 and thus rack 33 can be disassociated from the primary track 15.

Mounted on opposing sides of rack 33 are parallel secondary track members 35. Associated with these secondary track members 35 by means of secondary track engaging elements 37 in the form of rollers are a pair of arm members 39. Arm members 39 are connected to crossbar 41 which is pivotably mounted in cup members 43 of brackets 45 which extend from bar 16. Arm members 39 comprise telescoping sections 40 and 42, each having a series of apertures 44 which, together with a springably-urged stud or the like, permits lengthwise adjustment of the arm members.

Diagonal struts 51 extending from arm members 39 to crossbar 41 provide added stability to the structure. These struts, as well as all other elements of the carrier of this invention, are preferably located so as not to interfere with opening of the rear door or trunk of a motor vehicle when the carrier is in the transit position. The rack member 33 may be equipped with a plurality of ground engaging members such as legs 53 having rollers 55 and legs 57, the latter being stowed away by means of clamps 59 when the rack is in transit. The rack 33 may also be equipped with a handle 61 or equivalent means which can be grasped preliminary to lowering the rack to the takeoff position. Depending from primary track members 15 are a pair of bearing brackets 63 between which is a shaft 65 terminating at one end in crank 67. Extending from shaft 65 to eyelets 69 on the rear of rack member 33 are cables 71. Mounted on shaft 65 are a pair of drum members 73 around which the cables 71 are wound when rack 33 is being raised to the transit position. By the expedient of inwardly offsetting eyelets 73 from the points of attachment of the cables 71 to shaft 65, the cables 71 will wind progressively along drum members 73 rather than bunch up in one location thereon. The provision of dual points of attachment of the cables to the rack member 33 is preferred to facilitate raising of the rack 33 to the transit position. It is to be understood, however, that one cable centrally attached to the rack member 33 could be employed.

As shown in FIG. 2 wherein the rack member 33 is illustrated in the transit position A, the takeoff position D, and intermediate positions C and D, the angle 75 formed by the intersection of the longitudinal axis of the secondary track 35 and the longitudinal axis of the associated arm member 39 in positions A and D and therebetween is less than 90°. The angle 75 increases as the rack 33 nears the transit position A but does not exceed 90° due in this embodiment to the upward curvature of the secondary track 35. This angular relationship permits the rack 33 to be raised and seated in the transit position A by movement within primary tracks 15 with relative ease, such as by the use of a winch arrangement or other equivalent elevational mechanism.

The operation of the carrier assembly will now be explained from the point that a load is placed on the rack member 33 at ground level (takeoff position). Of particular note is the fact that movement of the rack either to or from the transit position is positively controlled throughout, the front end by the combination of the primary tracks 15 and primary track engaging means 31 and the rear end by the combination of the secondary tracks 35, pivotably mounted arms 39, and secondary track engaging means 37. Thus, by actuating crank 67, cables 71 commence winding around drums 73. The front end of rack 33 is raised to position C by sliding movement of the rollers or primary track engaging means 31 in primary tracks 15. Simultaneously with raising of the front end of rack 33 to position C, the rear end thereof travels towards the vehicle 1 while the secondary track engaging means 37 travel to the closed end of the secondary tracks 35. At this point further actuating of the crank 67 causes the arm 39 to rotate towards vehicle 1 thereby lifting the rear end of the rack 33 to the transit position A atop the car. To lower the rack, the crank 67 is first reversed to provide sufficient play in the cables 71 so that the rack member 33 can be withdrawn to a point where it begins the downward journey. Thereafter, the weight of the rack member 33 alone or with a load will cause the cables 71 to unwind of their own accord. The lowering speed can be controlled by regulating the reversal of the crank arm. Once in the takeoff position, wherein the rack is supported completely over the ground, the rack member is supported by legs 53 having rollers 55. The load can then be removed from rack member 33 and the latter returned or the rack member can be disengaged from the car by removal of cables 71, the release of arm members 39 from the cup portions 43, coupled with slight raising and pulling of the rack 33 to allow the primary track engaging means 31 to come out of primary tracks 15 through apertures 32. Additional ground support is obtained by releasing legs 57, which if desired can be equipped with rollers (not shown) so that the rack can be rolled along the ground with relative ease.

It is to be understood that many modifications of carrier assembly of this invention as herein illustrated and described may be made by those familiar with the art without departing from the spirit and scope thereof.

What is claimed is:

1. A carrier assembly comprising parallel, laterally spaced primary track means each having a roof line portion and a lowering portion downwardly depending from the roof line portion, a rack member, primary track engaging means associated with said rack member for movement thereof along said primary track means between a transit position and a takeoff position, secondary track means on opposing sides of said rack member, pivotally moveable arm members having secondary track engaging means associated with said arm members for movement of said arm members in secondary track means and engagement therewith between said transit position and said takeoff position of said rack member, said arm members and said secondary track means being so disposed relatively to each other when said rack member is between said transit position and said takeoff position that the longitudinal axes of associated arm members and secondary track means intersect at an angle of less than 90°, and elevating means for raising said rack member from said takeoff position to said transit position.

2. The apparatus of claim 1 wherein said arm members and said primary track means are angularly and longitudinally adjustable whereby said carrier assembly is capable of being mounted on a plurality of vehicle sizes.

3. The apparatus of claim 1 wherein said arm members are detachably pivotally mounted.

4. The apparatus of claim 1 wherein said primary track engaging means detachably engageable with said primary track means.

5. The apparatus of claim 1 wherein said transit position and said takeoff position of said rack member are parallel to the ground.

6. A rack member adapted for carrying cargo on a car top carrier having a pair of parallel, laterally spaced primary track means, and pivotally mounted arm members terminating in secondary track engaging means, said rack member comprising a platform having parallel longitudinally extending side members, primary track engaging means mounted on said side members and associated with one end thereof, and secondary track means mounted on said side members and associated with the other end of said side members.

References Cited

UNITED STATES PATENTS

| | | | |
|---|---|---|---|
| 2,931,528 | 4/1960 | Mabry | 214—450 |
| 3,229,838 | 1/1966 | Johnson | 214—450 |

HUGO O. SCHULZ, Primary Examiner